(12) United States Patent
Jolin et al.

(10) Patent No.: US 11,744,414 B2
(45) Date of Patent: *Sep. 5, 2023

(54) HAND DRYER AND DISPLAY

(71) Applicant: Modocast, LLC, Chicago, IL (US)

(72) Inventors: Brian S. Jolin, Chicago, IL (US);
Dominic J. Scandinaro, Chicago, IL (US); Cosmin D. Miclea, Morton Grove, IL (US); Renzo Francesco Giuliano Ruiz, Oranjestad (AW); Kristine M. Hernandez, Aurora, IL (US)

(73) Assignee: Modocast, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,271

(22) Filed: May 17, 2021

(65) Prior Publication Data
US 2022/0031129 A1 Feb. 3, 2022

Related U.S. Application Data

(63) Continuation of application No. 16/442,120, filed on Jun. 14, 2019, now Pat. No. 11,006,791, which is a continuation of application No. 15/011,534, filed on Jan. 30, 2016, now Pat. No. 10,342,398.

(60) Provisional application No. 62/278,909, filed on Jan. 14, 2016, provisional application No. 62/110,326, filed on Jan. 30, 2015.

(51) Int. Cl.
*H04L 67/55* (2022.01)
*A47K 10/48* (2006.01)
*G06Q 30/0241* (2023.01)

(52) U.S. Cl.
CPC ......... *A47K 10/48* (2013.01); *G06Q 30/0241* (2013.01); *H04L 67/55* (2022.05)

(58) Field of Classification Search
CPC .......... H04L 41/22; H04L 67/26; H04L 67/55
See application file for complete search history.

(56) References Cited

U.S. PATENT DOCUMENTS

| 4,914,833 A | 4/1990 | Pilolla et al. |
|---|---|---|
| 5,031,337 A | 7/1991 | Pilolla et al. |
| 5,146,695 A | 9/1992 | Yang |
| 6,038,786 A | 3/2000 | Aisenberg et al. |

(Continued)

FOREIGN PATENT DOCUMENTS

| KR | 20080029143 | | 4/2008 |
|---|---|---|---|
| KR | 20120107355 | A | 10/2012 |

(Continued)

*Primary Examiner* — Farzana B Huq
(74) *Attorney, Agent, or Firm* — Erickson Law Group, PC

(57) ABSTRACT

The invention provides a plurality of display devices such as hand dryers, each with a programmed computer display, and all communicating to a central location via a high speed link system. A display screen is mounted to each of the hand dryers and viewable by a user while drying the user's hands. A processor is located within the housing and is in signal-communication with the display screen. The high-speed link system is in signal-communication with each processor and an external data source, wherein the data source communicates with the processor to change the image displayed on the display screen. Sensors communicate ambient conditions outside of the display screen to a database.

19 Claims, 11 Drawing Sheets

(56) References Cited

U.S. PATENT DOCUMENTS

| | | | |
|---|---|---|---|
| 6,050,000 | A | 4/2000 | Curzon |
| 6,429,912 | B2 | 8/2002 | Nagasaki |
| 6,388,609 | B2 | 9/2002 | Paese et al. |
| 6,583,556 | B2 | 6/2003 | Oishi et al. |
| D477,037 | S | 7/2003 | O'Connor |
| 6,611,092 | B2 | 8/2003 | Fujishiro |
| 6,640,356 | B1 | 11/2003 | Hans |
| 6,779,206 | B1 | 8/2004 | Sykes |
| 2001/0032353 | A1 | 10/2001 | Contadini et al. |
| 2005/0145745 | A1 | 7/2005 | Lewis |
| 2006/0171660 | A1* | 8/2006 | Hsu .................. A47K 10/48 |
| | | | 386/358 |
| 2008/0004963 | A1* | 1/2008 | Montalbano ....... G06Q 30/0264 |
| | | | 370/310 |
| 2008/0052952 | A1 | 3/2008 | Nelson |
| 2009/0000140 | A1 | 1/2009 | Collins |
| 2010/0134296 | A1 | 6/2010 | Hwang |
| 2012/0124859 | A1 | 5/2012 | May et al. |
| 2013/0031799 | A1 | 2/2013 | Nelson |
| 2014/0230269 | A1 | 8/2014 | Bayley |
| 2014/0253336 | A1 | 9/2014 | Ophardt |
| 2014/0375457 | A1 | 12/2014 | Diaz |
| 2015/0000025 | A1 | 1/2015 | Clements |
| 2015/0216372 | A1 | 8/2015 | Ahmed |
| 2016/0275779 | A1 | 9/2016 | Hajdenberg |

FOREIGN PATENT DOCUMENTS

| | | |
|---|---|---|
| WO | 2005055791 | 6/2005 |
| WO | 2007112016 | 10/2007 |
| WO | 2012076521 | 6/2012 |
| WO | 2014033427 | 3/2014 |

\* cited by examiner

HAND DRYER AND DISPLAY

This application is a continuation of U.S. Ser. No. 16/442,120, filed Jun. 14, 2019, which is a continuation of U.S. Ser. No. 15/011,534, filed Jan. 30, 2016 and claims the benefit of U.S. Provisional Application No. 62/110,326, filed Jan. 30, 2015; and US Provisional Application No. 62/278,909, filed Jan. 14, 2016.

TECHNICAL FIELD OF THE INVENTION

The invention pertains to hand dryers that include a digital display screen for conveying information, such as advertising. The invention also pertains to interactive display devices. The invention also pertains to a sensor system for collecting environmental and human data for analysis.

BACKGROUND OF THE INVENTION

Hand dryers which include display screens for displaying information are known. One such hand dryer includes an integrated modem that automatically updates the stored images every 24 hours. Up to 20 images are stored and displayed in sequence.

The present inventors have recognized that it would be desirable to provide a display screen for a hand dryer that was nearly instantly responsive to a centralized control to display news, information, images and advertising. The present inventors have recognized that it would be desirable to provide a display screen for a hand dryer that was easily updated and reconfigured from a remote location.

The present inventors have recognized that it would be desirable to provide a display screen for a hand dryer that included additional functional and interactive features.

The present inventors have recognized that it would be desirable to provide an electronic system for hand dryers or other devices that included an interactive display screen and sensors for collecting environmental and human data for analysis. The present inventors have recognized that it would be desirable to use this data for advertising and marketing to consumers.

SUMMARY OF THE INVENTION

The invention provides an interactive screens for hand dryers, or billboards or other informational stations that would be useful throughout airports, shopping malls, sporting arenas, museums, hotel lobbies, outdoor areas, coffee shops, etc.

The invention provides a sensor module or board that is useful to collect environmental and human data for analysis.

One aspect of the invention provides a plurality of hand dryers, each with a programmed computer display, and all communicating to a central location via a high speed link system.

The invention provides a hand dryer with a display screen and a proximity sensor that senses the proximate location of a user to the screen. A processor within the hand dryer may calculate, store, record, monitor and/or analyze data corresponding to the presence of the user, the number of such users per unit of time, the time durations of proximate users, etc. This data may be retrieved locally or centrally and may be used for marketing and advertising analysis.

The invention provides an audio sensor that may be used to calculate, store, record, monitor and/or analyze data corresponding to the actual use of the hand drying function (use of the drying fan). The audio sensor may be used to modify the display or audio associated with the display. For example, the audio volume of the loudspeaker may be raised when the drying fan is operated. For example, the display screen could display "Good Bye" when the drying fan is timed out.

Throughout this application an exemplary embodiment is illustrated and described in the form of a hand dryer. It is to be understood that the display screen, the interactive controls, the sensors and related electronics could alternately be mounted into another type appliance, an information station, or another location that is exposed to people.

According to one embodiment, a hand dryer includes a housing, a fan, a heater, a display screen, a primary processor and a secondary processor directly interfaced with the primary processor. The fan is located within a housing. The heater is also located within the housing. The fan draws air past the heater to heat the air and to dispense the air from within the housing externally of the housing to dry a user's hands. The display screen is mounted to the housing and viewable by a user while drying the user's hands. The processor is located within the housing and is in signal-communication with the display screen.

A high-speed link is in signal-communication with the processor and an external data source, wherein the data source communicates with the processor to change the image, video, text or other data displayed on the display screen.

The high-speed link may comprise a wireless receiver. The high-speed link may comprise a subscriber line. The hand dryer may comprise a USB drive, a hard disc drive or a compact flash memory or like device for local memory and operational storage.

The preferred system of the invention may comprise a central data source, and a plurality of powered hand dryers. Each of the hand dryers includes a display screen mounted to a front thereof and viewable by a user while drying the user's hands. Each of the hand dryers includes a display processor located therein and in signal-communication with the display screen. Each of the hand dryers includes a high-speed link in signal-communication with the display processor and the central data source.

The high speed links may comprise wireless receivers and the central data source comprises a wireless transmitter to communicate with each of the wireless receivers.

The high speed links may comprise subscriber lines and the central data source may communicate through the subscriber lines to the hand dryers.

The high-speed links may comprise Ethernet cables, and the central data source communicates through the Ethernet cables to the hand dryers.

The system may comprise a local processor and a LAN in signal-communication between the local processor and the plurality of display processors, the local processor in signal-communication with the central data source. The LAN may comprise an Ethernet system. The LAN may comprise a wireless system.

An exemplary method of the invention for entering, storing and displaying media information, comprises the steps of: entering and storing media information into an information management application, wherein media information is stored according to advertising time blocks for each display application; providing a plurality of information display applications, each located in a different location; providing an information instruction server application for communicating information from the information management application to the information display applications; and, using the information management application, determining an open time block in a particular information display application and entering a media information data associated with the time block for display at the information display application.

The information display application may comprise the step of using a LAN to communicate to a plurality of information display screens at a site.

The method may include the further step of using the information display applications, communicating operational status to the information management application through the information instruction server.

According to the invention, an Ethernet programmability feature allows internet downloading of advertising or employee training information through cable, telephone, wireless or satellite connection.

The processor within a hand dryer may have its stored information updated at any time. The processor may e-mail its operating status to a central office. A plurality of display screens may be used in a grid display. One processor in a hand dryer may be specified as a master unit for any number of slave processors.

The hand dryer is preferably activated by a reflected infrared sensor. A polycarbonate lens, protected with frequency match tinting, filters out ambient light. The circuitry preferably has self adjusting timeout and fail safe off protection. The circuitry is microprocessor controlled to detect and reject false signals and the circuitry shall self calibrate to provide uniform sensitivity. The dryer preferably has dual centrifugal blower wheels driven by 0.25 horsepower, dual shaft, series motor, operating at 7500 RPM. Preferably, the dual blowers deliver about 183 CFM. Dual, nickel-chromium heating elements may be provided that each delivers 1000 W to provide a 73 F degree rise over the ambient temperature. Both heating elements and blower motor may be protected with automatic resetting thermostats.

The voltage regulation of the computer display is provided by the hand dryer voltage regulation circuitry (100-277 VAC, 50/60 Hz) thus precluding the need to provide different models for different operating voltages. One unit will be voltage compliant for the entire world market. It would take individual units of 100, 120/127, 208, 220, 240 and 277 to cover this voltage range if the automatic voltage regulation circuitry was not utilized.

The hand dryer of the present invention may provide a WiFi captive portal. The hand dryer may provide a WiFi hotspot for the location that broadcasts internet for patrons. It could be configured that patrons must first complete a short form before gaining access to the Wifi. The information collected from the patron may be used for marketing or other purposes.

The hand dryer may provide BLUETOOTH Low Energy ("BLE") Broadcast. APPLE has branded this functionality iBeacon. It is the broadcasting of a certain Universally Unique Identifier ("UUID") over BLE and utilizing a native application on iOS, ANDROID, or WINDOWS phone to recognize that broadcasted UUID and recognize the location of the user. This information can be data mined or used for marketing purposes in real-time or otherwise.

The hand dryer may use a proximity sensor to have information such as advertising displayed on the screen that monitors, analyzes, records and/or reacts directly to user's proximity, gestures or movement. The hand dryer may provide an audio sensor to dynamically augment the information based on the use of the hand dryer or other audio processed.

The hand dryer may display social media content on-screen in real-time by scraping for hashtags. For example, someone posts a photo to INSTAGRAM with hashtag #unitedcenter and it may be displayed on the hand dryers within the venue, i.e., on hand dryers at Chicago's United Center.

According to a further enhancement of the invention, the hand dryer can include a plurality of sensors signal-connected to a sensor board or module that receives sensor signals and processes the signals in ways useful to a variety of users. For example, a barometric air pressure sensor can be used to determine an accurate count of people in a room, changes in the weather, toilet usage by determining flushes, etc. An air quality sensor can sense the presence of unwanted gases or odors in the room to trigger an air freshening operation or alert a maintenance person. A proximity sensor can be used to determine the number of people walking by the hand dryer or standing in front of the hand dryer. A high frequency sensor can be used to determine hand dryer usage and motor/fan condition. A near field communication sensor can be used to transfer data to/from the hand dryer device and a user's smart phone of other computer device. A distance and gesture sensor can be used to for interactive communication between a user and the hand dryer device. A user's hand gestures can be used to communicate to the hand dryer device. An eye tracking sensor can be used to determine the attention of the observer to the screen or to any particular advertisement or message appearing on the screen. The amount of time an observer's eye is directed to the advertisement or message can be calculated, and summed, averaged or otherwise analyzed for multiple observers. An automatic identification and data capture sensor can be used to identify objects and enter data directly into the database of the hand dryer device. An occupancy sensor can be used to control room lighting. A power sensor can be used to diagnose the condition of the fan motor.

A further aspect of the invention provides that devices can be signal connected to the hand dryer and can be controlled by the hand dryer to release pre-determined fragrances. The release can be controlled for when the air quality is unsatisfactory or can be controlled to release a fragrance that serves an advertising function. For example, an advertisement for a laundry detergent could trigger the release of a fragrance of that laundry detergent, or an advertisement for an certain restaurant could trigger the release of food fragrances associated with that restaurant.

The invention can provide multi-screen ad campaigns, real-time display, real-time restroom monitoring, 15.16 HD display, add network software development kit ("SDK"), iBeacon (BLE), behavioral data, NFC/RFID, Amber alert, WiFi hot-spot, air-quality monitoring, NOVA 2 automatic warm air The software can distribute usage data, environment data, and monitoring data to certain companies. Air quality data can be monitored to outside health awareness companies to help monitor public air quality.

Advertisers would be able to see hour by hour how many users are exposed to advertising from a new campaign.

Publishers would have access to this information and more data upon request and subscription.

Because the hand dryer is constantly analyzing data from its surroundings, the advertising has the ability to change on a minute by minute basis as it adapts to its new surroundings. As people come and go, the information changes which makes the advertising more efficient and catered to its audience.

Because the screen has multiple layouts this could be used to display up to 20 Messages within 20 seconds or could be used to display one message throughout the whole screen.

Another possible use of the invention is that by providing sensors throughout multiple locations, mass data, mega-data or aggregate data can be calculated, summed averaged throughout an airport, city, state of country. For example, the air pressure sensors could be useful in weather prediction, other sensors such as the Bluetooth or RFID sensors could be useful to analyze trends in the movement of people.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

Figure 1:
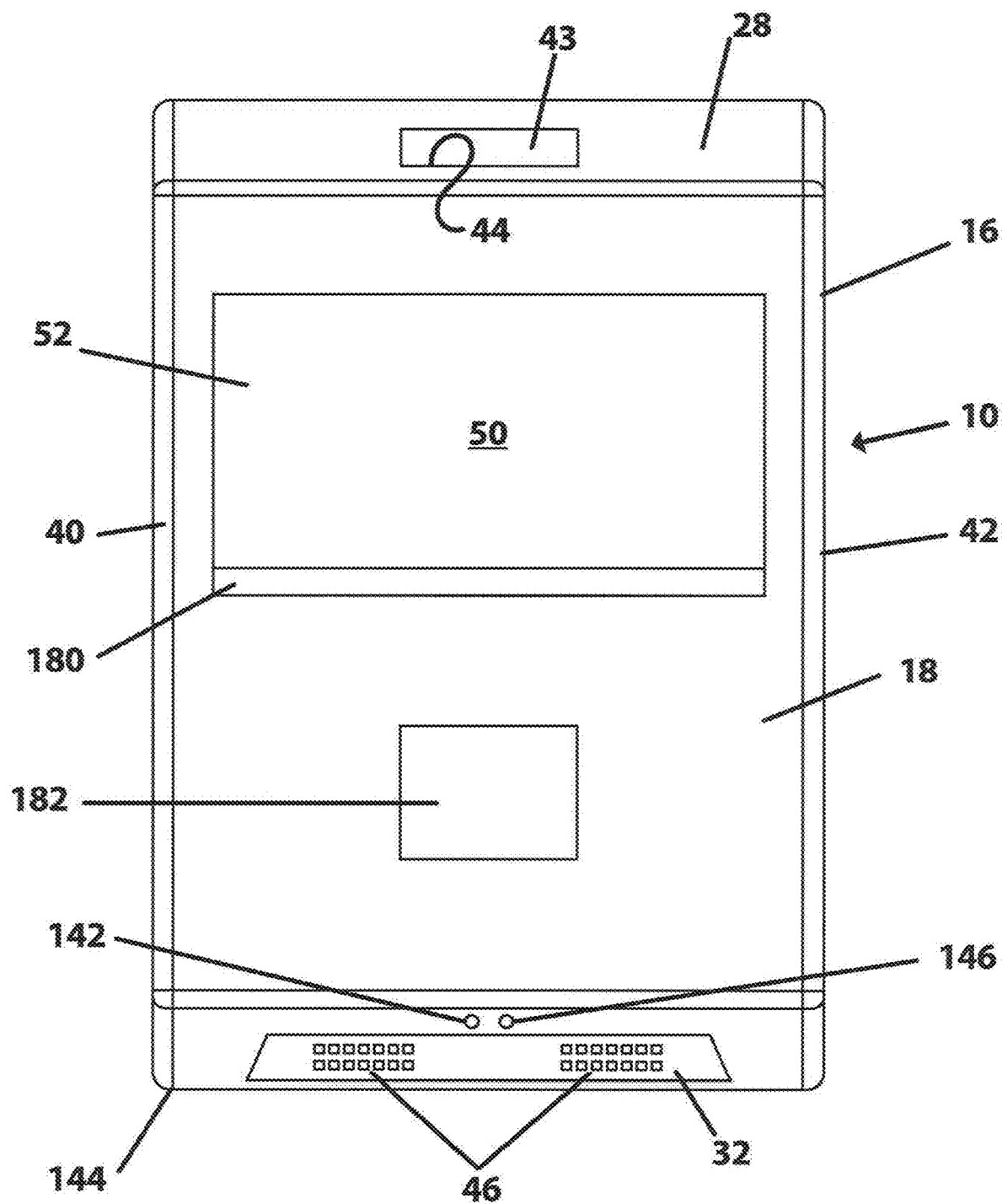
FIG. 1 is a front view of a hand dryer according to the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

US Published Application 2008/0004963 is hereby incorporated by reference in its entirety to the extent that it is not contrary to the present disclosure.

This specification incorporates by reference U.S. Ser. No. 16/442,120, filed Jun. 14, 2019; U.S. Ser. No. 15/011,534, filed Jan. 30, 2016; U.S. Provisional Application No. 62/110,326, filed Jan. 30, 2015; and U.S. Provisional Application No. 62/278,909, filed Jan. 14, 2016.

FIG. 1 illustrates a hand dryer 10 that incorporates the present invention. The hand dryer includes a housing 16 having a front wall 18 connected to a top wall 28, a bottom wall 32, and left and right side walls 40, 42. An access panel 43 is provided to close a maintenance opening 44. Beneath the panel 43 are USB inputs 38, 39 for maintenance and data input/output functions.

A dryer component 45 is included within the housing for providing a warm air discharge through openings 46 through the bottom wall.

A display screen 50 is provided within an opening 52 through the front wall 18. The display screen is a digital display screen preferably having a 15 inch diagonal dimension with a 16:9 aspect ratio and resolution of 1366×766. One or more small loudspeakers (not shown) may be provided with the display screen or as separate elements.

As shown in FIG. 1, the hand dryer 10 includes an antenna 180 for transmitting and receiving wireless information. The antenna is flush mounted to the front wall 18 and adjacent to the screen 50.

A faceplate 182 is mounted onto the front wall 18 and may be used to identify the hand dryer, or for displaying a trademark or advertising. A proximity sensor 142 and an LED 146 may be mounted to the front wall 18. The sensor 142 and the LED 146 are exposed for operation through openings in the front wall 18. An audio sensor 144 is shown mounted behind the front wall 18.

Figure 2:
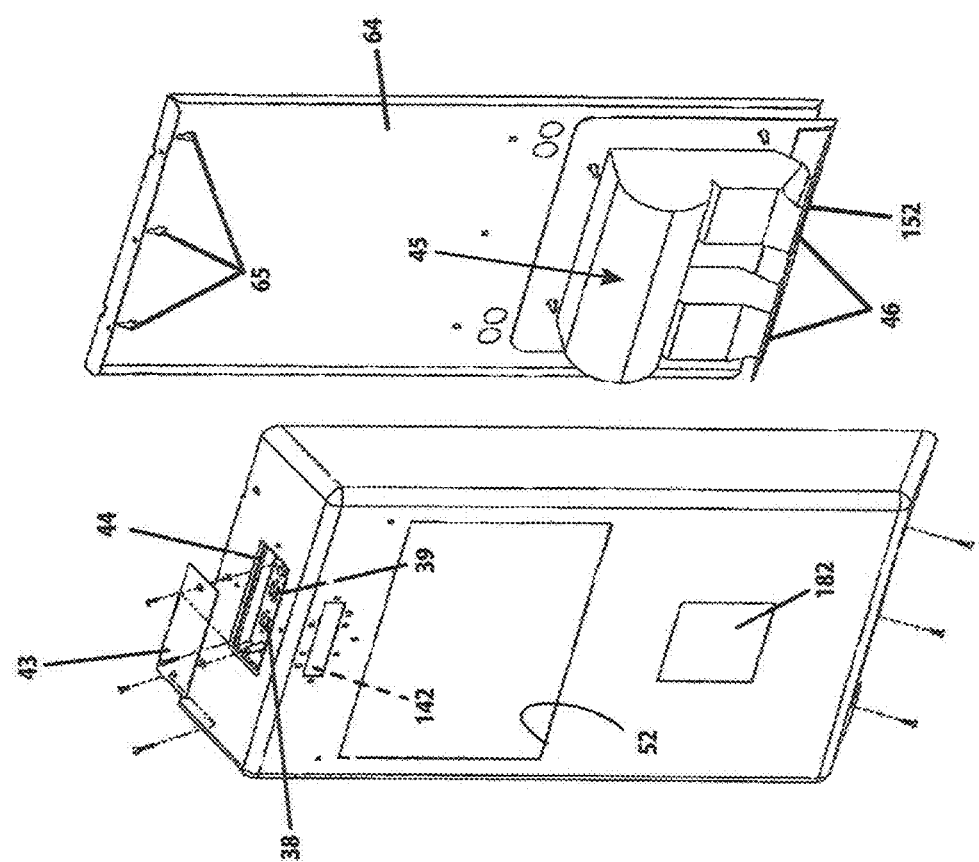
FIG. 2 is an exploded front perspective view of the hand dryer shown in FIG. 1.

FIG. 2 shows a back plate 64 that substantially closes the housing and provides apertures 65 for mounting the housing to a wall. The dryer component 45 is mounted to the back plate 64.

According to one exemplary embodiment, the dryer component 45 is an ASI brand surface mounted sensor hand dryer, Model 0180, available from American Specialties, Inc. of Yonkers, N.Y., USA. U.S. Pat. Nos. 4,914,833; 5,031,337; 6,050,000; and 5,146,695 disclose constructions of wall mounted hand dryers, herein incorporated by reference. The dryer component includes an IR sensor 152 that activates the dryer when a user's hands are placed close to the sensor 152. The dryer is turned off when the hands are removed from proximity to the sensor, or turned off by a timer. The motor and heating elements have internal, resetting automatic thermostat protection. The dryer component may operate at 183 CFM of heated air to provide a drying time of less than 30 seconds for the user's hands. The circuitry shall have self-adjusting time-out and fail-safe off protection controlled by microprocessor to detect and reject false signals. The circuitry will automatically self-calibrate to provide uniform sensitivity over its entire life span. The infrared sensor 152 shall be protected by a heavy-duty polycarbonate lens frequency match-tinted to filter out ambient light. The unit is internally electrically grounded. The display screen is preferably covered by quarter inch safety glass to protect the screen from impact or touching.

Figure 3:
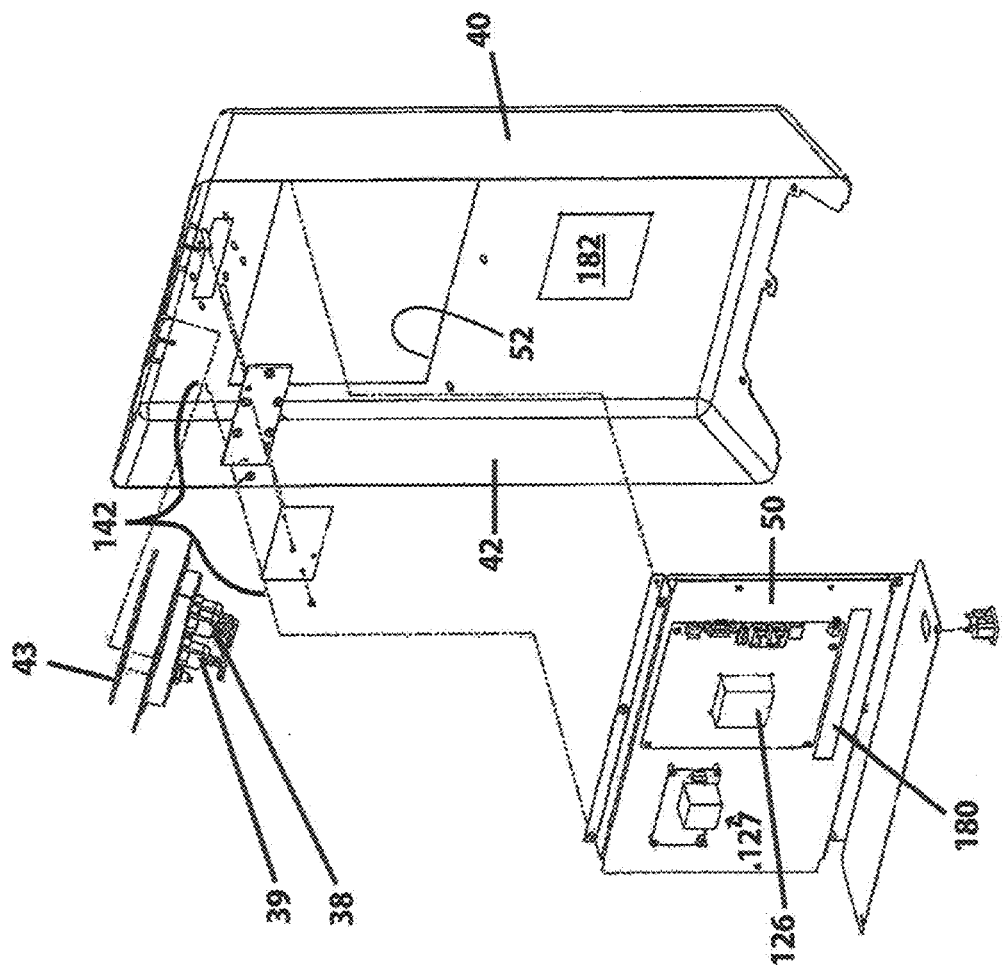
FIG. 3 is an exploded rear perspective view of the hand dryer shown in FIG. 1, with a back cover removed.

FIG. 3 shows a rear view of the housing including the USB inputs 38, 39 and the screen 50 with associated components. FIG. 3 shows the location of a primary processor 126 and a secondary processor 127.

FIGS. 2 and 3 show an alternate, upper location of the proximity sensor 142 than shown in FIG. 1.

Figure 4:
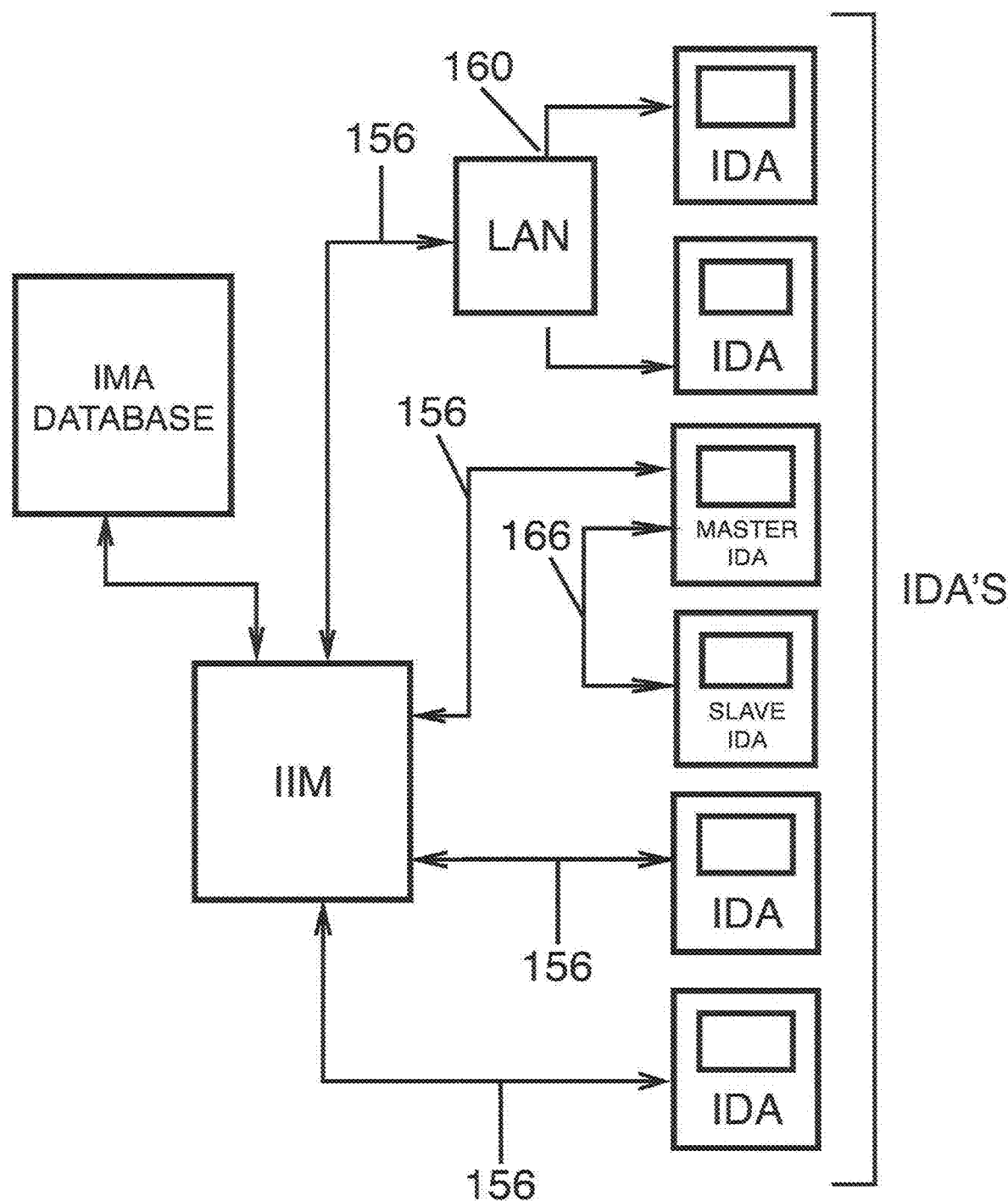
FIG. 4 is a schematic view of a system for controlling multiple hand dryer screens.

The invention provides a method of entering, storing, and displaying image and media information as illustrated in FIG. 4. The system's public interface will display images and other media content on a computer based device. The system is comprised of three individual systems or applications:

1) Information Management Application (IMA)
2) Information Display Applications (IDA)
3) Information Instruction and Media Server (IIM-Web application)

The IMA is a user interface or application and corresponding database. The IMA may be used to enter and store information about the site and location of the particular IDA, and specific to the IDA, instructions, images, and other forms of media. The images and media may be stored in either the database or in a file based system with the database storing the reference information to that media. The IMA has the ability to communicate with the IIM server or database either via a LAN or through the Internet. The IMA will also have the ability to store marketing information related to the location and site of the IDA machines. The application or software may optionally query the IIM to determine which IDAs have available "slots" or "blocks" based on the stored marketing information for quoting and reporting purposes.

The IDA is a device to display images, information, and other media content based on the instructions provided by the IIM. The IDA may connect to the Internet directly via a link 156 (cable, wireless, or other type) or other type of network, such as a local area network (LAN) 160, or via a master/slave link 166 between IDA's for the purpose of receiving instructions from the IIM. The IDA application may provide authentication information to the IIM. Once the IDA is verified, it may request instruction from the IIM service. Based on these instructions, the IDA may download the relevant images and media. The instructions shall include image or media information and duration. This will determine how the images will display and function. The IIM service may also provide instructions concerning updates, change in schedule, and other information as deemed necessary for the IDA to function. The IDA may also provide information to the IIM concerning logging or possible failures.

The IIM is an application that is capable of connecting to the same database of information and media content, which the IMA has provided. Based on this information, the IIM will determine and create instruction for the many IDA's as they connect to the IIM service. The individual IDA machine will access the IIM through the Internet. The IDA will send an HTTP request or other unspecified type of request to the IIM web application. The web application will verify the validity of the request by matching up the authentication information along with the IDA I.P. and MAC Address against the information stored in the database. Once this is verified, the web application will query the database and determine the instructions (as described above) for that particular display unit. The IDA may pass other logging and diagnostic information which the IIM will interpret and store as needed.

A particularly useful process is set forth below.
- A) The IDA sends a web request to the IIA, the IIM authenticates and logs the requesting display (IDA). Then the IIM queries the database schedule and responds with a list of images the IDA shall download from the FTP server.
- B) The IDA sends a request in a pre-defined interval. The IIM may be configured to log this activity for every IDA. Reports or alerts could be generated for displays that do not send a request, or several consecutive requests, as they are programmed.
- C) The software on the IDA may be configured to delete old images if they are unused and have an older file date, for example, the IDA could delete images older than 1 month old.
- D) The IDA may be configured to send a request to the IIM reporting its internal software version number. If the IIM determines there is a newer version of the IDA software, it may be configured to respond with the new file name of the IDA software. The IDA downloads that update and executes it, which starts the new version of the IDA software. Once the new version is started, the old version is stopped.
- E) Referring to part "B", the process may poll or query via an external process or within the IMA software for inactive units that are declared as in production.
- F) The IDA stores ad view and dryer usage data collected by the proximity sensor and audio sensor interfaced with the SBC microcomputer. This data is transmitted regularly to the IIM for storage.

Referring to "E", "External Process" refers to a separate program or software that runs all the time that constantly checks or polls the database. If this process finds a problem, it could Email a manager to notify of the situation. "In production" refers to machines that are stated to be "in use", or not a unit sitting in storage. This may be more effective than the IMA pointing out a problem, since it could only report a problem when someone is actually using the program.

Figure 5:
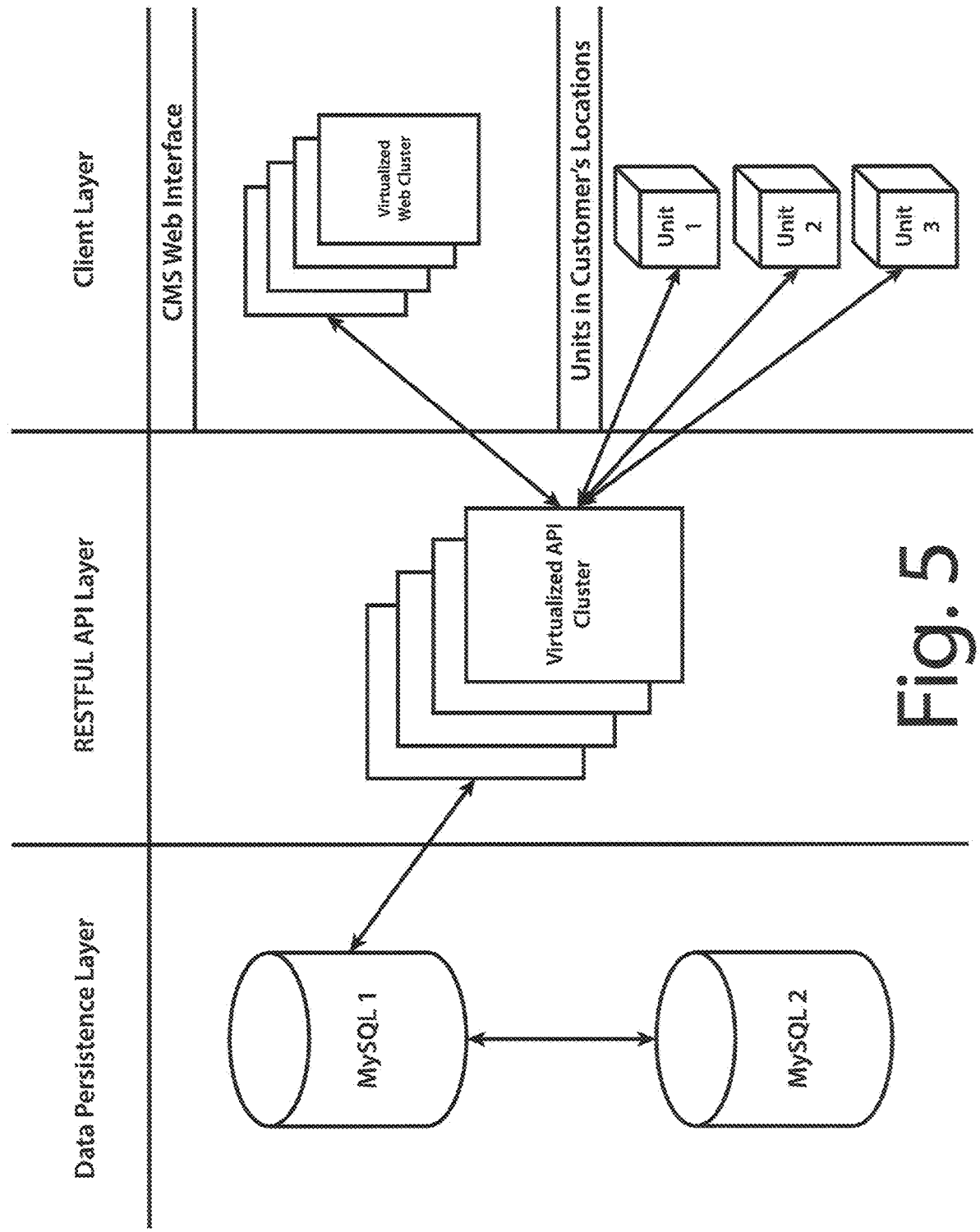
FIG. 5 is a method step algorithm demonstrating the operation of the hand dryer shown in FIG. 1.

FIG. 5 illustrates a software and system configuration for accomplishing system control of the hand dryers.

The client may run LUBUNTU, a light version of the open source LINUX operating system UBUNTU. The client may use CRONTAB to regularly check for software changes and content updates when an internet connection is present by making GET requests to a RESTful web service existing at the server layer from a combination of BASH and PHP scripts cronned locally. The content may display in an HTML5, CSS3 full-screen display powered by open source GOOGLE CHROME software. The client may display a series of image and video ad content maintained at the server layer in addition to content from various other sources such as sports scores, weather info, stock quotes, flight information, breaking news, instagram images, twitter posts, etc. Audio corresponding to the displays may be provided.

In the Server Layer (Content Management and RESTful services), a cluster of load balanced CENTOS web servers may sit in front of master to master replicated MySQL database servers to provide a REST layer for interface with both the server side content management system and the client layer. The content management system may consist of a Single Page JavaScript Application allowing the end-user(s) to manage their content displayed at the client layer as well as toggle which modules of dynamic content may be displayed. This SPA may interface with the same RESTful layer of services as the client layer.

Figure 6:
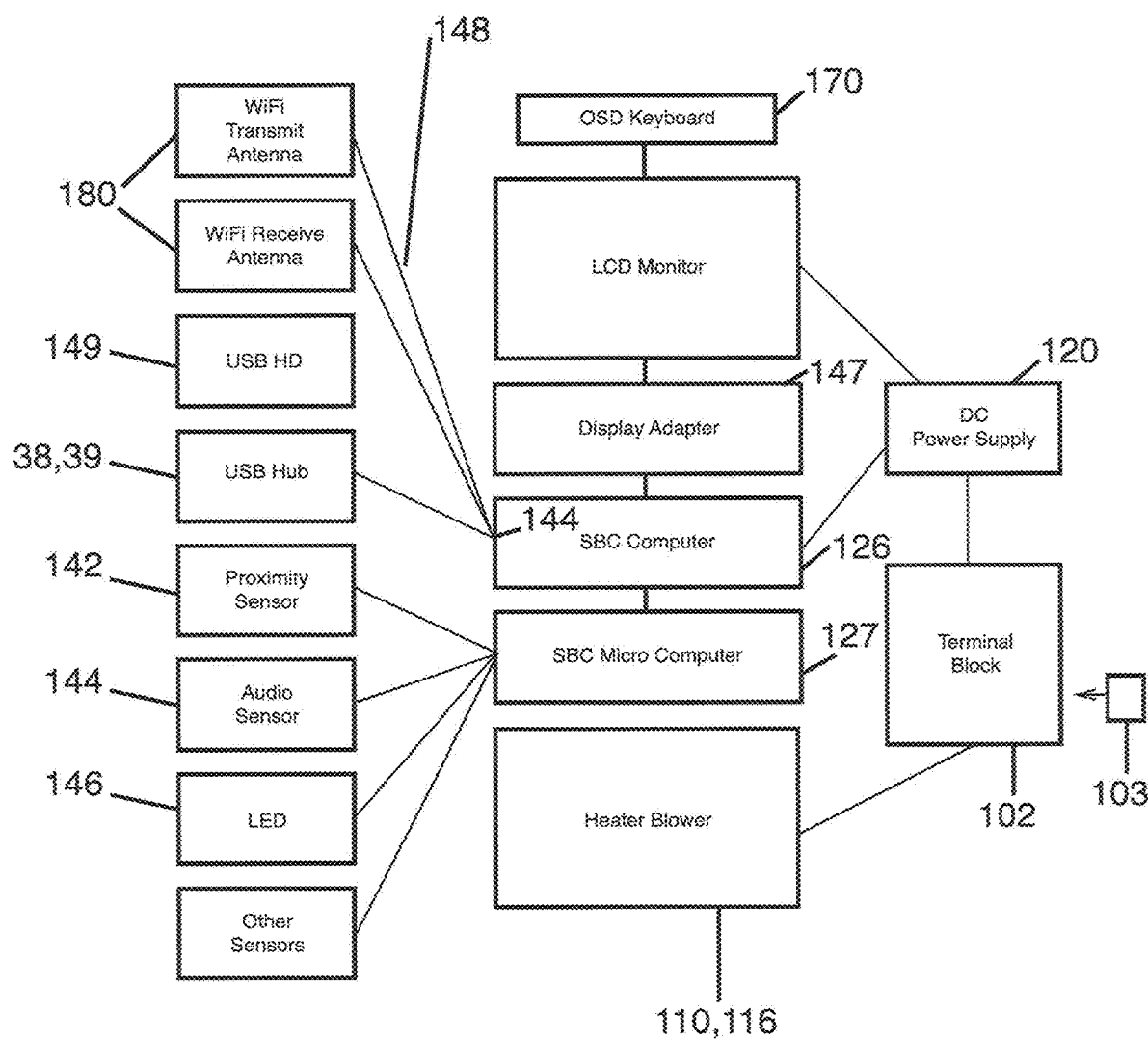
FIG. 6 is a schematic block diagram of the hand dryer according to the present invention.

FIG. 6 illustrates the components of a hand dryer 10. The primary processor 126 includes flash memory or other type memory. The processor 126 includes an input/output 144 compatible with WiFi or Ethernet over a high-speed Internet connection 148 to a server. A USB HD 149 may be removably signal-connected to the USB hub with ports 38, 39 that are signal-connected to the primary processor 126. The USB HD may be a micro USB storage device, i.e., a flash memory device. A flash card reader may also be provided beneath the panel 43 adjacent to the USB ports.

The secondary processor 127 is signal-connected to the proximity sensor 142, the audio sensor 144 and the LED 146. The secondary processor 127 is signal-connected by USB to the primary processor 126. The secondary processor conditions and communicates signals from the proximity sensor, the audio sensor, or other sensors to the primary processor 126.

The primary processor 126 has an output signal-connected to a display adaptor 147 that controls and conditions signals to the display 50. The primary processor 126 may include circuitry for providing audio signals to one or more loudspeakers (not shown). Alternately, the circuitry and loudspeakers could be provided integrated with the display screen 50. The loudspeakers provide audio that may correspond to the image on the display, i.e., the ability to play videos or other visual displays with sound.

The proximity sensor 142 may be an infrared sensor, an optical sensor or a sonic sensor, or other type sensor as known in the art. The proximity sensor sends a signal to the secondary processor 127 that a user is in proximity to the screen 50 and may also sense movement of the user.

The screen 50 is powered by the DC power supply 120. Domestic power 103 is connected to a terminal block 102 which directs power to the DC power supply 120 and to the dryer component 45. The screen 50 is configured to support an on screen display keypad 170. The primary processor 126 includes a wireless circuit board that is signal-connected to the antenna 180 that is mounted to the cabinet adjacent to the screen.

The USB ports 38, 39 allow the dryer 10 to be programmed and/or to receive data files by a local technician even if no remote communication is available to the dryer 10. The technician may use the USB HD 149 to input or output data or programming to/from the processor 126.

The hand dryer of the present invention may provide a WiFi captive portal. The hand dryer provides a WiFi hotspot for the location to broadcast internet service for patrons that must first complete a short form before gaining access. The information collected from the patron may be used for marketing or other purposes.

The hand dryer may provide BLUETOOTH Low Energy ("BLE") Broadcast. APPLE has branded this functionality iBeacon. It is the broadcasting of a certain Universally Unique Identifier ("UUID") over BLE and utilizing a native application on iOS, ANDROID, or WINDOWS phone to recognize that broadcasted UUID and recognize the location of the user. This information can be data mined or used for marketing purposes in real-time or otherwise.

The hand dryer may use the proximity sensor 142 to make advertising displayed on the screen react directly to user's proximity or movement. Even if a user is just watching the screen without drying hands, the hand dryer secondary and primary processors may monitor, analyze, record and react to the presence of the user as sensed by the proximity sensor 142. The audio sensor 144 may monitor, analyze, record and react to the use of the dryer component 45 or other audio signals and dynamically augment the displayed content based on the use of the hand dryer or other audio that is processed.

The LED 146 may be used to indicate on/off status of the dryer 10 or to indicate activity of the wireless network or the processors by blinking. The LED may also be configured to pulse or blink to interact with the displayed information on the screen.

The hand dryer may display social media content on-screen in real-time by scraping for hashtags. For example, someone if posts a photo to INSTAGRAM with hashtag #unitedcenter, it may be displayed on the hand dryers within the venue, i.e., on hand dryers at Chicago's United Center.

In a further enhancement, multiple sensors and interactive features can be incorporated into the hand dryer. The sensors and led(s) are interfaced with a microcontroller 127, via different types of input/output pins depending on the specifications of the individual sensor. The microcontroller 127 runs a simple software application that monitors the sensors at a regular interval (1 second) and transmits sensor data over serial connection (via usb) to the NUC processor 126. Software running on the processor 126 (such as a NUC) updates a local NoSQL database with data as it flows in and then sends summaries of it to a REST API every 10 minutes from each unit. This data can then be displayed within the CMS system on the dashboard to show bathroom activity, optimize ads etc. The data can also be used directly on the unit for making interactive ads based on the type of traffic, gestures being performed in front of the unit, etc.

Figure 7:
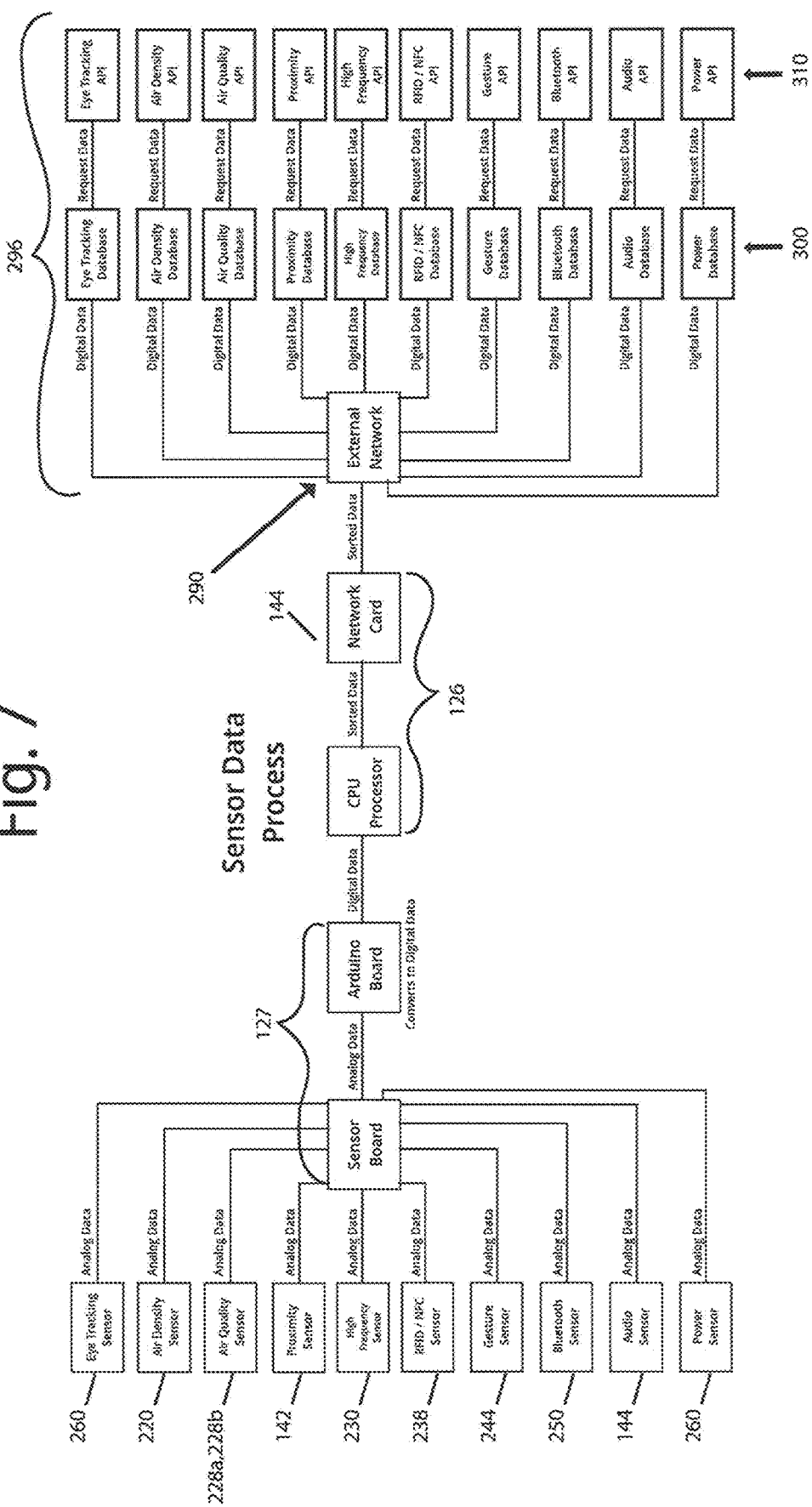
FIG. 7 is a block diagram of an enhanced embodiment of the invention.

As shown in FIG. 7, the sensors include:

1. Barometric Pressure Sensor/Air Density Sensor 220

The sensor measures atmospheric pressure. The measured pressure tendency can forecast short-term changes in the weather. Numerous measurements of air pressure can also be used within surface weather analysis to help find surface troughs, high-pressure systems and frontal boundaries.

The barometer sensor can also be used to measure the air density to determine an accurate count of people in a room, or any other tasks that require an accurate pressure reading. In addition to monitor changes in the weather, measured pair pressure can be used to estimate how many times the toilet is used in a day, in that flushing a toilet changes the room air pressure. The sensor data is recorded as the density of the room which has the capability to detect how many people were in the room at any point.

An occupancy software feature that uses the detected occupancy of a space by people, turns the lights on or off automatically. The sensing of occupancy can be by the air density sensor. Occupancy sensors and software can be used to save energy, provide automatic control, and comply with building codes.

2. Air Quality Sensor 228a/228b

Two air quality sensors 228a, 228b can be provided. The sensor 228a detects odors and the sensor 228b detects temperature and humidity. The signals from the two sensors are calculated and analyzed to produce an air quality signal. These sensors are designed for comprehensive monitoring of indoor and out-door air conditions. The sensors are responsive to a wide scope of harmful gases, such as carbon monoxide, alcohol, acetone, paint thinner, and formaldehyde. Even if the sensors do not output specific data to describe target gases concentrations quantitatively, the sensors are still able to be used in applications that require only qualitative results. The results of sensor data can be used to control automatic refresher sprayers and auto air cycling systems.

The air quality sensors can measures gases and foul smells in the air. This provides a capability to inform facility managers that the bathroom needs to be cleaned. The data that is gathered from the sensors could also be used to monitor health and environmental issues in public spaces. The sensors can trigger an air freshener dispensing to enhance the room fragrance when the environment changes due to foul smells.

3. Proximity Sensor 142

The proximity sensor 142 detects and produces data on the number of people walking by and/or standing in front of the dryer. It can also trigger a light to indicate where to place your hands. The light can be tuned into advertising purposes as well such as by flashing to attract people to approach the hand dryer or display screen.

4. High Frequency Sensor 230

High-frequency sensors are very rugged seismometers, often termed geophones that cover higher frequency bands. High-frequency geophones are passive velocity transducers (coil/magnet geophones), These sensors are most often used in active-source experiments, but can be used to record a variety of local and regional weak-motion signals and noise in the bandwidth.

This sensor output is recorded as high-frequency noise and provides the capability to detect when and how long the dryer has been activated.

This sensor can be used to measure the RPMs coming off the hand dryer motor. Any change in these frequencies indicate the life expectancy of the hand dryer. This is an early warning system for pre-detected failure of the hand dryer motor.

The data from the sensor can also be used to indicate the hand dryer usage minute by minute. This data along with proximity sensing can accurately quantify the ROI on the advertising being displayed.

5. Near Field Communication (NFC)/RFID Sensor/Transmitter 238

The system has built-in programming options that make the device suitable for a wide range of applications for proximity and vicinity identification systems.

Information can be passed along from the Hand Dryer to Smartphones by tapping the two devices together, which runs sharing data such as contact info or photographs into a simple task. Advertising campaigns can pass information along to the consumers such as coupons, rewards, tickets, etc.

Radio-frequency Identification (RFID) is the wireless use of electromagnetic fields to transfer data, for the purposes of automatically identifying and tracking tags attached to objects. The tags contain electronically stored information. Some tags are powered by electromagnetic induction from magnetic fields produced near the reader. Some tags collect energy from the interrogating radio waves and act as a passive transponder. Other tags have a local power source such as a battery and may operate at hundreds of meters from the reader. Unlike a barcode, the tag does not necessarily need to be within line of sight of the reader and may be embedded in the tracked object. RFID is one method for Automatic Identification and Data Capture.

6. Bluetooth (BLE)/IBeacon Transmitter/Receiver "Sensor"

This "sensor" is really a receiver/transmitter and is used to transmit data signals to BLE Devices. The data signals can be such things as coupons, text messages, or alarm warning systems such as Amber Alert and human behavioral data.
Automatic Identification and Data Capture (AIDC).

This could be used automatically identifying objects, collecting data about them, and enter that data directly into computer systems (i.e. without human involvement). Either or both of the sensors 238 or 250 could be used for AIDC.

This can be used to identify consumers that have used the system in the past and engage with them directly again. This method can be used to send data via Mobile Applications such as Facebook, Instagram, Twitter, SnapChat, Google, Yahoo, etc.

This is possible by offering a Software Development Kit (SDK) to interact with other technologies through the Hand Dryer By allowing other companies like Google, Facebook, etc. access to this capability a wide range of advertising capabilities and real-time ROI ad tracking is made available.

7. Distances and Gesture Sensor 244

This is a sensor (such as a JESTER sensor) that is capable of determining simple gestures, such as hand configurations. The sensor recognizes the distance of an object away from the sensor. This sensor can be used to determine how long someone is looking at an advertisement displayed on the screen; it could also be used for interactive advertising. Gesture control gives the ability to interact with content on the screen by waving your hand, or making other gestures.

The gesture sensor and software can be available from Leap Motion, Inc. (www.leapmotion.com) of San Francisco, Calif., US.

8. Eye Tracking Sensor 260

This sensor sees what advertisements the user is looking at and the processor 126 can monitor, record, sum, average or otherwise calculate the time a user looks at the screen or at a particular advertisement. The eye tracking sensor can also cause interactive control of the screen in that the display can be changed based on eye tracking signals from the sensor, for example an advertisement can be made bigger on the screen when the observer gazes at the advertisement for more than 2 seconds.

Eye tracking is the process of using eye tracking sensors to locate features of the eye and estimate where someone is looking, i.e., the point of gaze. The technology relies on infrared illumination and uses advanced mathematical models to determine the point of gaze. The particular sensor can be that made available by THE EYE TRIBE https://theeyetribe.com, at The Eye Tribe Aps, Amagerfaelledvej 56, Box 34, 2300 Copenhagen S, tel. no. 45 36 980 580.

9. Power Sensor

A power meter or sensor will consist of a measuring head, which contains the actual power-sensing element, connected via a cable to the meter proper, which displays the power reading. The head may be referred to as a power sensor or mount. Different power sensors can be used for different frequencies or power levels. Historically the means of operation in most power sensor and meter combinations was that the sensor would convert the microwave power into an analogue voltage which would be read by the meter and converted into a power reading. Several modern power sensor heads contain electronics to create a digital output and can be plugged via USB into a PC, which acts as the power meter.

This sensor is used to analyze power to identify a failing component in the hand dryer, before failure.

FIG. 7 illustrates that a network card, such as the input/output 144 of the processor 126 communicates sorted data from the sensors to an external network 290. This data is accumulated, sorted, averaged, summed, aggregated, calculated or otherwise processed in selectable databases 300 corresponding to the sensors. The data bases 300 can be queried by the user with software to display data 310 for analysis. The network 290 can be part of an external storage and processing network referred to as "cloud storage" and/or "cloud computing" 296 that is accessed remotely.

Other Features

A solid magnetic driver attached to the hand dryer cabinets unit that will vibrate frequencies to turn the cabinet into an audio transmitter. A blue light can be mounted to a bottom of the hand dryer. The light can be used for public security warnings.

Figure 8:
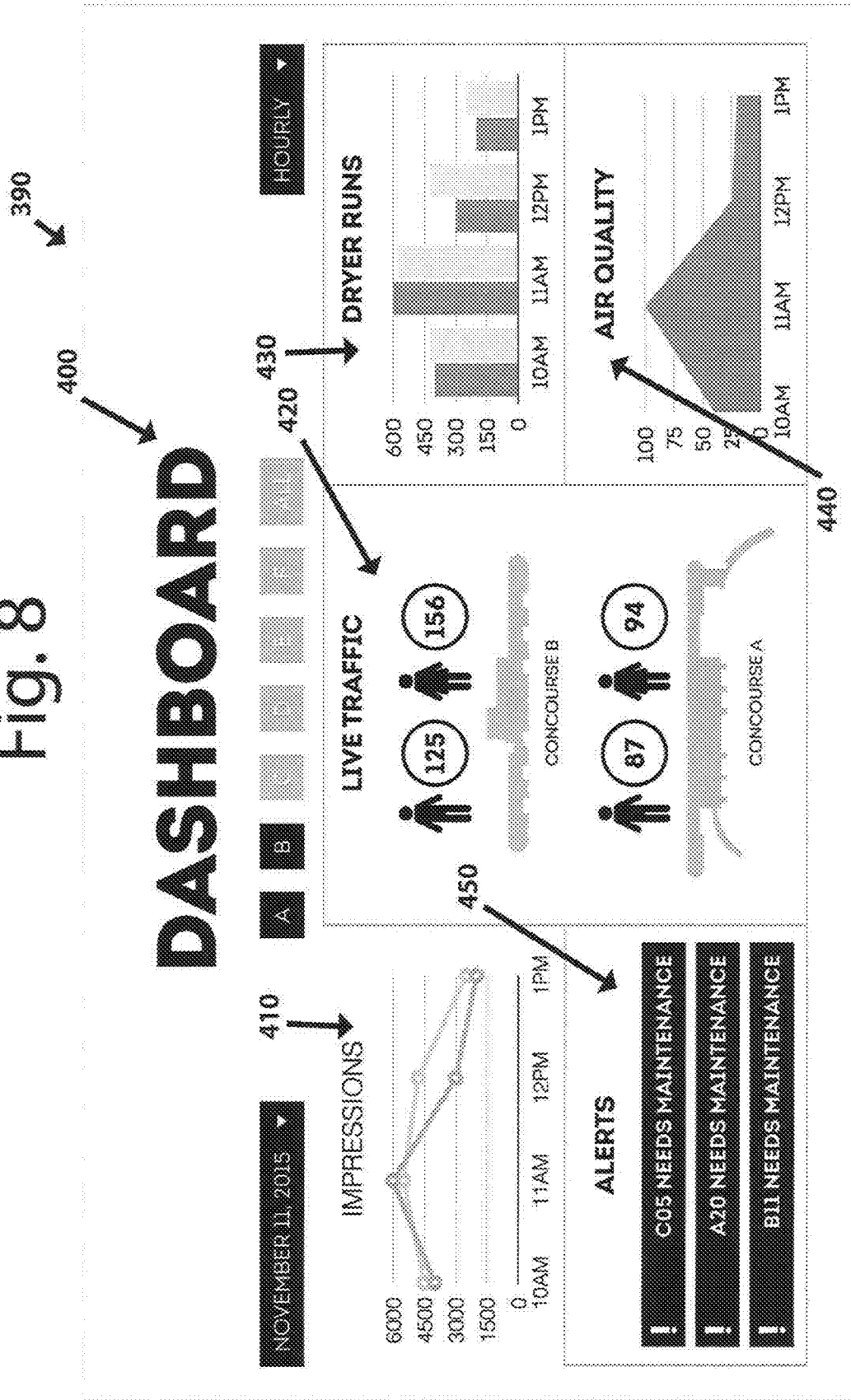
FIG. 8 is a display screen of a graphical user interface useful in monitoring use of the hand dryer and display screen of the invention.

FIG. 8 illustrates a display screen for a graphical user interface 390 referred to as the "Dashboard" 400. The graphical user interface 390 can be connected to a host computer that is remote from the hand dryer and can be accessed by a user or a subscriber to inform the user or subscriber of real time data, summed data or accumulated data regarding operation of the hand dryer and associated display screen. For example the user can be informed of the number of views or impressions 410 by the public of advertising on the display screen of the hand dryer. The user can be informed of the human traffic 420 though the restroom having the hand dryer. The user can be informed of the number of dryer runs or cycles 430. The user can be informed of the air quality within the restroom 440. The user can be alerted to maintenance requirements in the restroom or of the hand dryer 450.

Figure 9:
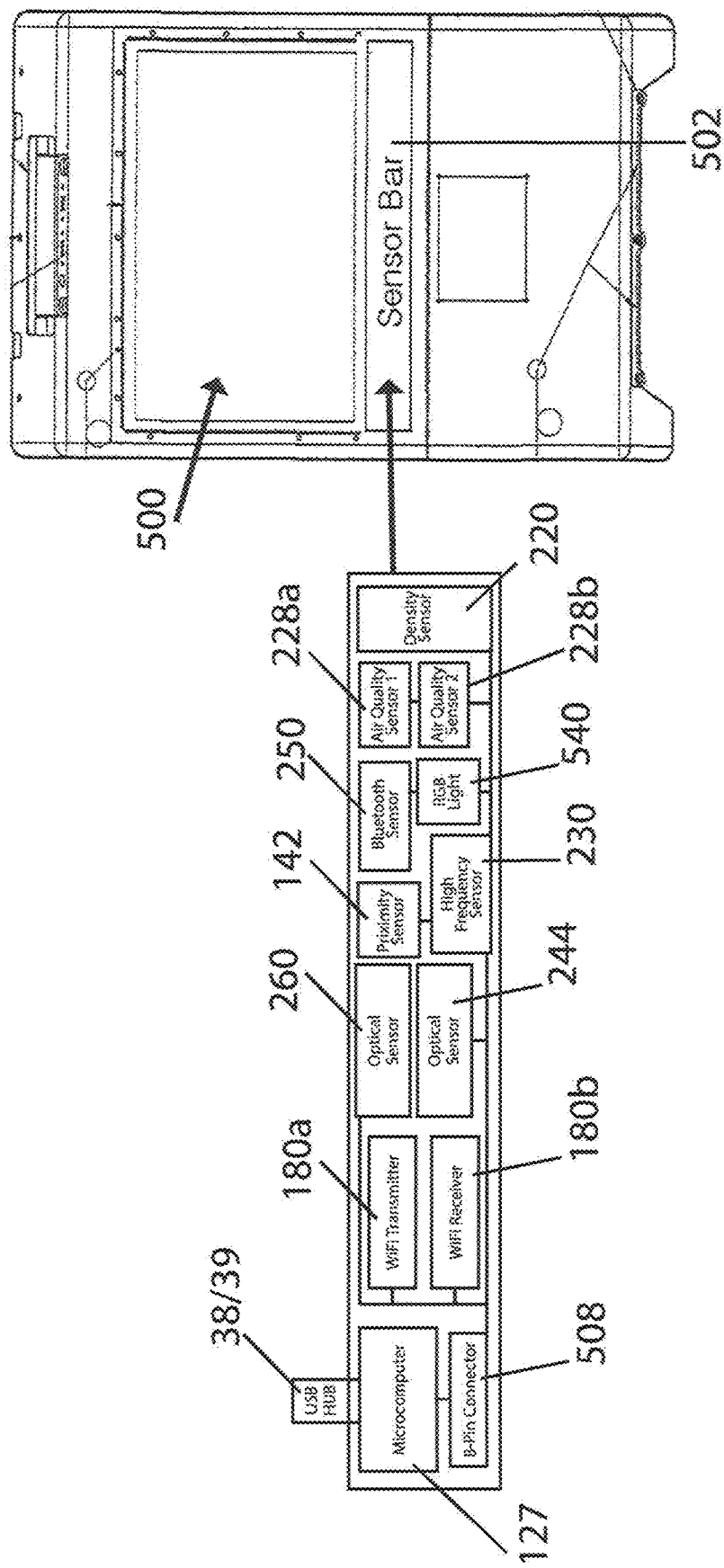
FIG. 9 is an elevation view of an alternate cabinet and sensor arrangement to that shown in FIG. 1.

FIG. 9 illustrates an alternate embodiment face 500 of the cabinet shown in FIG. 1. A sensor bar 502 includes the USB hub 38/39, an 8-pin connector 508, the micro-computer 127, the WiFi transmitter 180*a*, the WiFi receiver 180*b*, an optical sensor, such as the eye sensor 260, the gesture sensor 244, the proximity sensor 142, the high frequency sensor 230, the Bluetooth sensor 250, an RGB light 540, a first air quality sensor 228a, a second air quality sensor 228b, and the air density sensor 220. The bar 502 can have a protective covering that is compatible with the type of sensor covered, or no cover at all.

The RGB light 540 can be controlled to produce a variety of colors, depending on the aesthetic desire of the owner, or for signal purposes. The colors can be used to attract a user over to the hand dryer, by flashing or other attention getting method.

Figure 10:
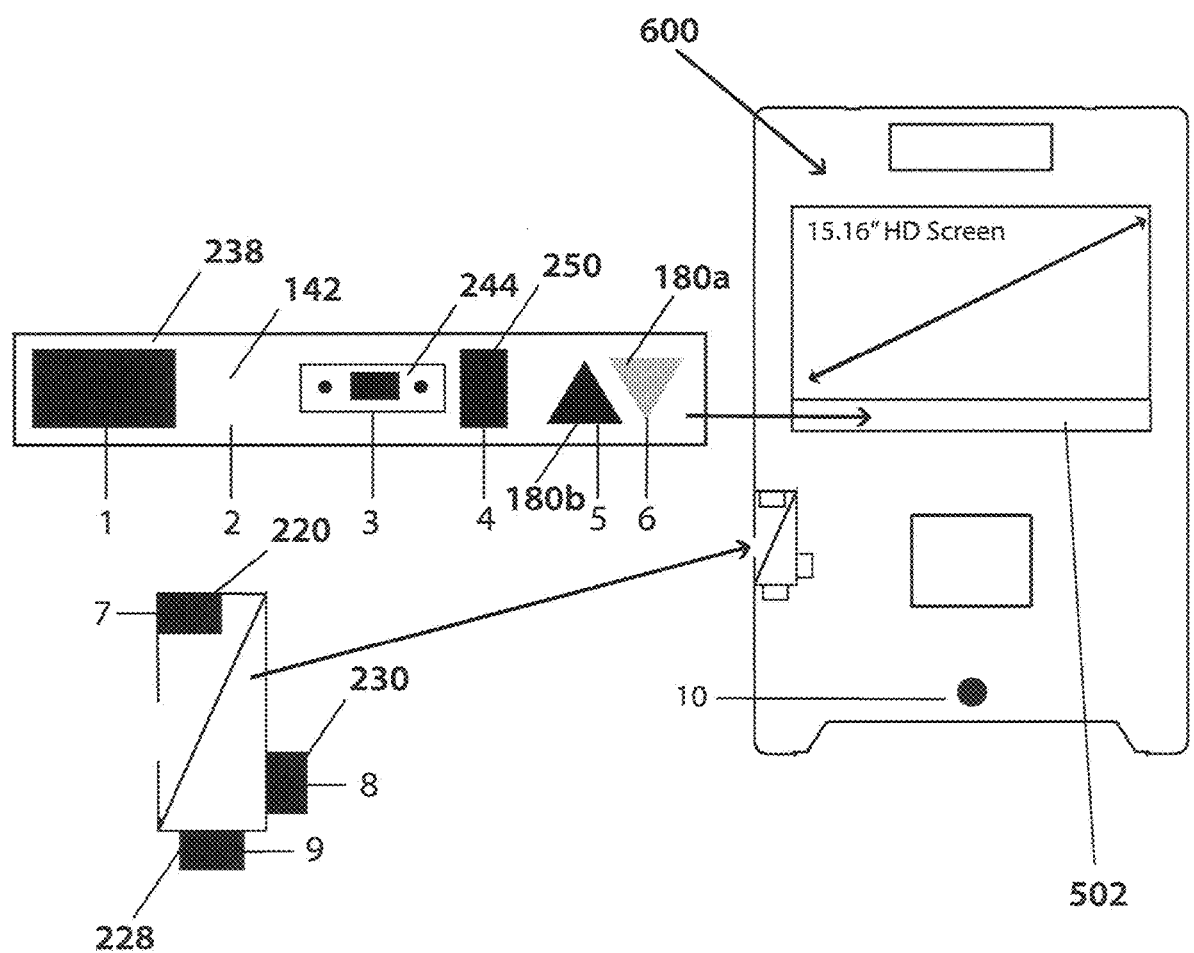
FIG. 10 is a further alternate cabinet and sensor arrangement to that shown in FIG. 1.

FIG. 10 shows a further alternate arrangement front face 600 incorporating the same sensors of FIG. 9.

Figure 11:
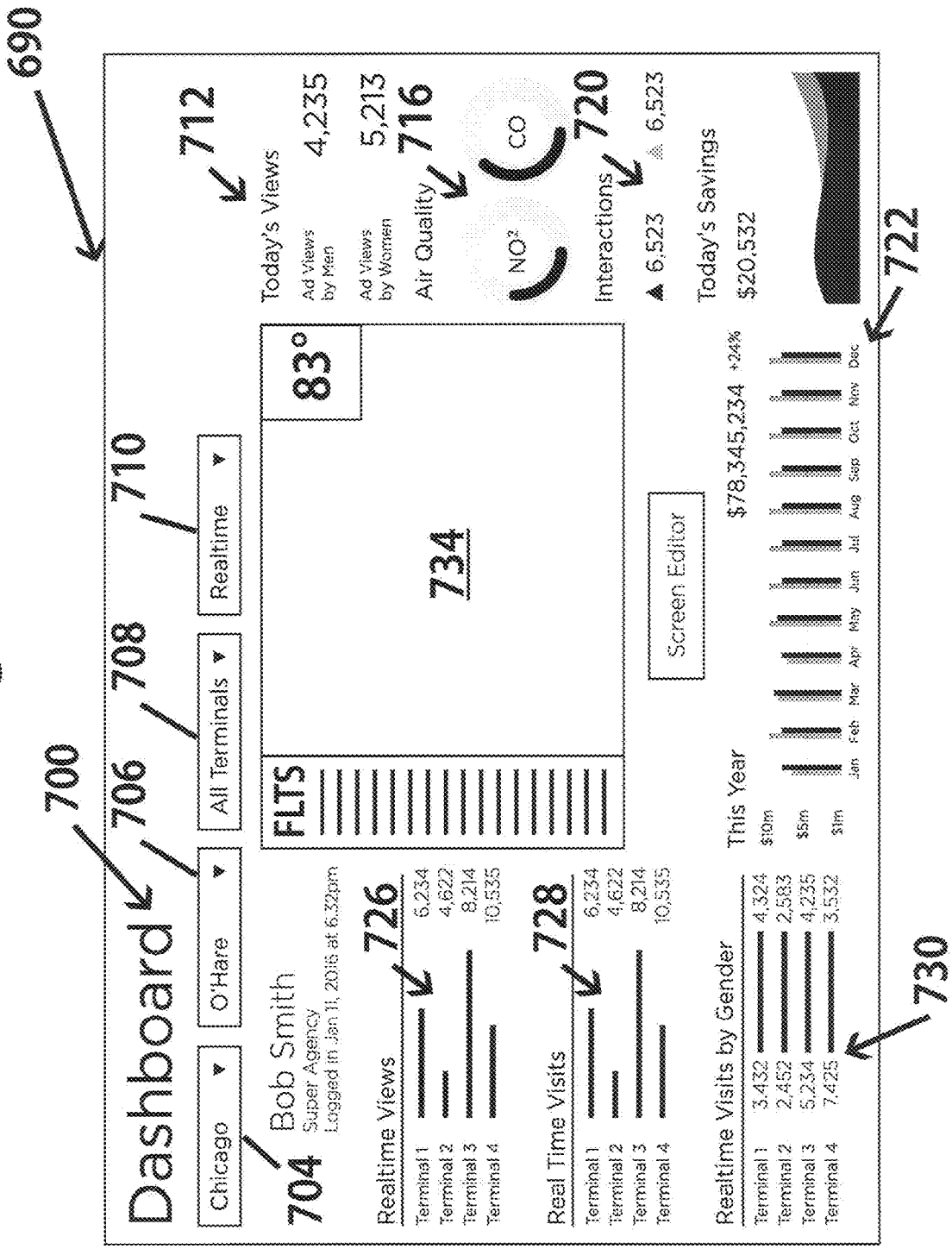
FIG. 11 is a display screen of an alternate graphical user interface useful in monitoring use of the hand dryer and display screen of the invention.

FIG. 11 shows an alternative display screen for a graphical user interface 690 to that shown in FIG. 8, referred to as the "Dashboard" 700. This dashboard is for a hand dryers located at O'Hare airport in Chicago. The graphical user interface 690 can be connected to a host computer that is remote from the hand dryer and can be accessed by a user or a subscriber to inform the user or subscriber of real time data, summed data or accumulated data regarding operation of the hand dryer and associated display screen. The dashboard includes dropdown boxes for selecting city 704, airport 706, particular airport terminal or all terminals 708, real time or other past time periods 710. The screen shows the number of advertisement views for each gender restroom 712, the air quality measuring NO2 and CO 716, the number of interactions with observers 720, the calculated savings to the facility by using the hand dryer instead of paper products 722, the number of real time views per terminal 726, the number of real time visits per terminal 728, and the real time visits by gender 730. The savings is calculated by using the hf sensor 230 to determine hand dryer operations. A central portion 734 of the screen includes useful information to the observer, such as flight information and weather information. All of the information depicted can be customized to the observer who may access the dashboard remotely by password. If the observer is interested in his own advertising the dashboard would display advertising results for that observer only.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A hand dryer, comprising:
a housing;
a fan located within said housing;
a heater located within said housing, said fan drawing air past said heater to heat said air and to dispense said air from within said housing externally of said housing to dry a user's hands;
a display screen mounted to said housing and viewable by a user while drying hands of the user;
an on board computer system located within said housing and in signal-communication with said display screen;
at least one sensor for determining a condition external to the housing, wherein said sensor communicates with said computer system, wherein said sensor comprises an RFID sensor;
a high-speed link in signal-communication with said computer system and an external data source;
wherein said data source communicates with said computer system to change the image displayed on said display screen; and
comprising a proximity sensor that senses the presence of a user in front of the screen.

2. The hand dryer according to claim 1, wherein said at least one sensor comprises an air pressure sensor.

3. The hand dryer according to claim 1, wherein said at least one sensor comprises an audio sensor.

4. The hand dryer according to claim 1, wherein said at least one sensor comprises an air quality sensor.

5. The hand dryer according to claim 1, wherein said RFID sensor comprises a near field communication (NFC) sensor.

6. The hand dryer according to claim 1, wherein said at least one sensor comprises a gesture sensor.

7. The hand dryer according to claim 1, wherein said at least one sensor comprises a plurality of sensors including an air pressure sensor; an audio sensor; an air quality sensor; a gesture sensor; and an eye tracking sensor.

8. The hand dryer according to claim 1, wherein said high-speed link comprises a wireless receiver.

9. The hand dryer according to claim 1, wherein said high-speed link comprises a subscriber line.

10. The hand dryer according to claim 1, wherein said on board computer comprises a USB drive.

11. The hand dryer according to claim 1, wherein the at least one sensor comprise a high frequency audio sensor to detect dryer usage.

12. The hand dryer according to claim 1, wherein the computer system comprises a primary processor and a secondary processor, wherein the secondary processor is directly linked to said at least one sensor and directly linked to the primary processor, wherein the primary processor is in signal-communication with the display screen.

13. The hand dryer according to claim 1, further comprising a WiFi captive portal, wherein the hand dryer provides a WiFi hotspot for the location that broadcasts internet for patrons.

14. A communications system comprising:
a central data source;
a plurality of powered hand dryers, each of said hand dryers including a display screen mounted to a front thereof and viewable by a user while drying hands of the user;
each of said hand dryers including a display processor located therein and in signal-communication with said display screen;
each of said hand dryers including at least one sensor for determining a condition external to the housing, wherein said at least one sensor comprises an RFID sensor; and
each of said hand dryers including a high-speed link in signal-communication with said display processor and said central data source;
wherein said data source communicates with said display processor to change the image displayed on said display screen; and
comprising a proximity sensor that senses the presence of a user in front of the screen.

15. The communications system according to claim 14, wherein said high speed links comprise wireless receivers and said central data source comprises a wireless transmitter to communicate with each of said wireless receivers.

16. The communications system according to claim 14, wherein said high speed links comprise subscriber lines and said central data source communicates through said subscriber lines to said hand dryers.

17. The communications system according to claim 14, wherein said high-speed links comprise Ethernet cables, and said central data source communicates through said Ethernet cables to said hand dryers.

18. The communications system according to claim 14, comprising a local processor and a LAN in signal-communication between the local processor and the plurality of display processors, said local processor in signal-communication with said central data source.

19. The communications system according to claim 18, wherein said LAN comprises an Ethernet system.

\* \* \* \* \*